United States Patent
Everhart et al.

(10) Patent No.: US 6,931,307 B2
(45) Date of Patent: Aug. 16, 2005

(54) TECHNIQUE FOR DATA SYNCHRONIZATION IN A MULTIPLE SYSTEM VEHICLE ARCHITECTURE

(75) Inventors: Charles Allen Everhart, Canton, MI (US); John Kefalos, Westland, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 1016 days.

(21) Appl. No.: 09/788,202

(22) Filed: Feb. 16, 2001

(65) Prior Publication Data

US 2002/0116498 A1 Aug. 22, 2002

(51) Int. Cl.$^7$ .............................................. G06F 19/00
(52) U.S. Cl. ............................................ 701/1; 701/48
(58) Field of Search ................................ 701/1, 36, 48, 701/200; 307/10.1; 709/227, 237

(56) References Cited

U.S. PATENT DOCUMENTS

| | | | |
|---|---|---|---|
| 4,945,486 A | * | 7/1990 | Nitschke et al. ............ 701/114 |
| 5,142,470 A | | 8/1992 | Bristow et al. |
| 5,261,092 A | | 11/1993 | McLaughlin et al. |
| 5,481,456 A | * | 1/1996 | Ogura ............................ 701/1 |
| 5,526,267 A | | 6/1996 | Sogawa |
| 6,067,521 A | | 5/2000 | Ishii et al. |
| 6,122,572 A | * | 9/2000 | Yavnai ......................... 701/23 |
| 6,202,008 B1 | * | 3/2001 | Beckert et al. ............... 701/33 |

* cited by examiner

*Primary Examiner*—Gary Chin
(74) *Attorney, Agent, or Firm*—Brinks Hofer Gilson & Lione

(57) ABSTRACT

A method for synchronizing data between computer systems in a multiple vehicle system architecture ensures the correlation of data between the systems. The method utilizes nametag configuration indicators, which are a series of bit values that correspond to the presence or absence of a nametag or other data point or set in a series of internal memory locations. The method comprises the steps of monitoring for synchronization initiation events, transmitting nametag configuration indicators between vehicle systems, comparing nametag configuration indicators, and, if desired, initiating appropriate resultant actions. In a preferred embodiment, the method of the present invention is directed at synchronizing data between a voice control system and a navigation system. In this embodiment, the method according to the present invention ensures that the two systems have identical nametag configuration indicators.

21 Claims, 4 Drawing Sheets

TECHNIQUE FOR DATA SYNCHRONIZATION IN A MULTIPLE SYSTEM VEHICLE ARCHITECTURE

FIELD OF THE INVENTION

The present invention relates to methods of synchronizing data between two computer systems. More specifically, the present invention relates to methods of synchronizing data between two systems in a motor vehicle containing a multiple vehicle system architecture.

BACKGROUND OF THE INVENTION

Modern motor vehicles frequently contain multiple computer systems, each of which is responsible for performing a particular function and storing particular pieces and/or sets of data. For example, many automobiles include such systems as voice control systems, navigation systems, and mobile communication systems. The use of multiple computer systems within a motor vehicle allows for the partitioning of data between the systems, which in turn enables each individual system to concentrate on a particular function or group of related functions. The partitioning of data between systems frequently necessitates communication between the various systems in order to handle data input or to provide meaningful data output. That is, when a function or event requires the involvement of multiple vehicle systems, the appropriate systems frequently need to interact with each other to assemble an appropriate response. Consequently, in motor vehicles employing multiple vehicle system architectures, various vehicle systems are often arranged in a manner that allows communication between the various systems by way of system interfaces.

Recent advances in technologies relating to geographical position determination and compact computer displays have led to the incorporation of graphical navigation systems into motor vehicles. These systems utilize map data to provide users with driving instructions and general navigational information. As such, these systems offer great assistance and convenience to drivers.

Voice recognition technology provides a method of data input that allows a driver to interact with a computer system through voice commands. U.S. Pat. No. 6,067,521 to Ishii et al. describes an arrangement in which a voice control system is integrated with a navigation system, and is hereby incorporated by reference in its entirety.

In an arrangement of multiple computer systems that are interrelated, one challenge to successful implementation is the ability to synchronize data between the systems. This challenge is particularly prominent in an architecture involving telematics and multi-media systems, such as navigation systems and voice recognition because of the complexity of data typically involved and the need for rapid updating of data. A voice control system typically assigns a brief sample of the user's voice to relevant data, such as a phone number or geographical position. In a multiple vehicle system architecture that includes both a voice control system and a navigation system, navigation data can be stored in one computer system, while data related to the voice control system can be stored separately. This partitioning of data between two systems allows the systems to make efficient use of their memory and also permits the systems to focus on a narrow function or task.

In an arrangement such as that mentioned above, the brief samples of voice that represent other data are commonly referred to as nametags. Due to the use of nametags, synchronization of data between the two systems is essential to ensure accurate and reliable performance of the systems. If synchronization does not occur or is unreliable, the systems may not interact well, resulting in loss of the benefits conferred upon the arrangement by the partitioning of data between the two systems.

Consequently, there is a need for a method of synchronizing data between two systems in a multiple vehicle system architecture that ensures accurate and reliable performance of the two systems.

SUMMARY OF THE INVENTION

The present invention provides the desired method of synchronization of data between two systems in a multiple vehicle system architecture. In a preferred embodiment, the present invention relates to a method of synchronizing data between a voice control system and a navigation system that utilizes nametags to represent data points, sets, or values. This embodiment utilizes nametag configuration indicators, which are memory area constructions that represent the status of the memory locations to which a user can store nametags or other data. The preferred data synchronization method comprises the steps of monitoring for events that signal a need for data synchronization, the first system transmitting its nametag configuration indicator to the second system via an interface between the two systems, the second system transmitting its nametag configuration indicator to the first system via the interface, both systems comparing their respective stored nametag configuration indicator with the nametag configuration indicator received from the other system, and if a mismatch occurs, triggering the performance of an appropriate resultant action by the system(s) detecting the mismatch. Resultant actions can include deletion of all nametags by one or both systems, deletion of mismatched nametags by one or both systems, or alerting the user as to the mismatched nametags and prompting the user for instruction as to the handling of the mismatched nametags.

DETAILED DESCRIPTION OF A PREFERRED METHOD OF THE INVENTION

The present invention provides a method for synchronizing data between multiple computer systems in a motor vehicle. The preferred method synchronizes data between a voice control system and a navigation system in a motor vehicle employing a multiple vehicle system architecture. The preferred method may, however, be used for synchronizing data between other suitable systems in other environments. For example, a mobile phone system that stores frequently dialed phone numbers or other data could be utilized in the present invention. The phone of the system could be integrated into the multiple vehicle system architecture of the vehicle, or could even comprise a personal mobile phone that is synchronized with data in one or more computer systems of the vehicle.

Figure 1:
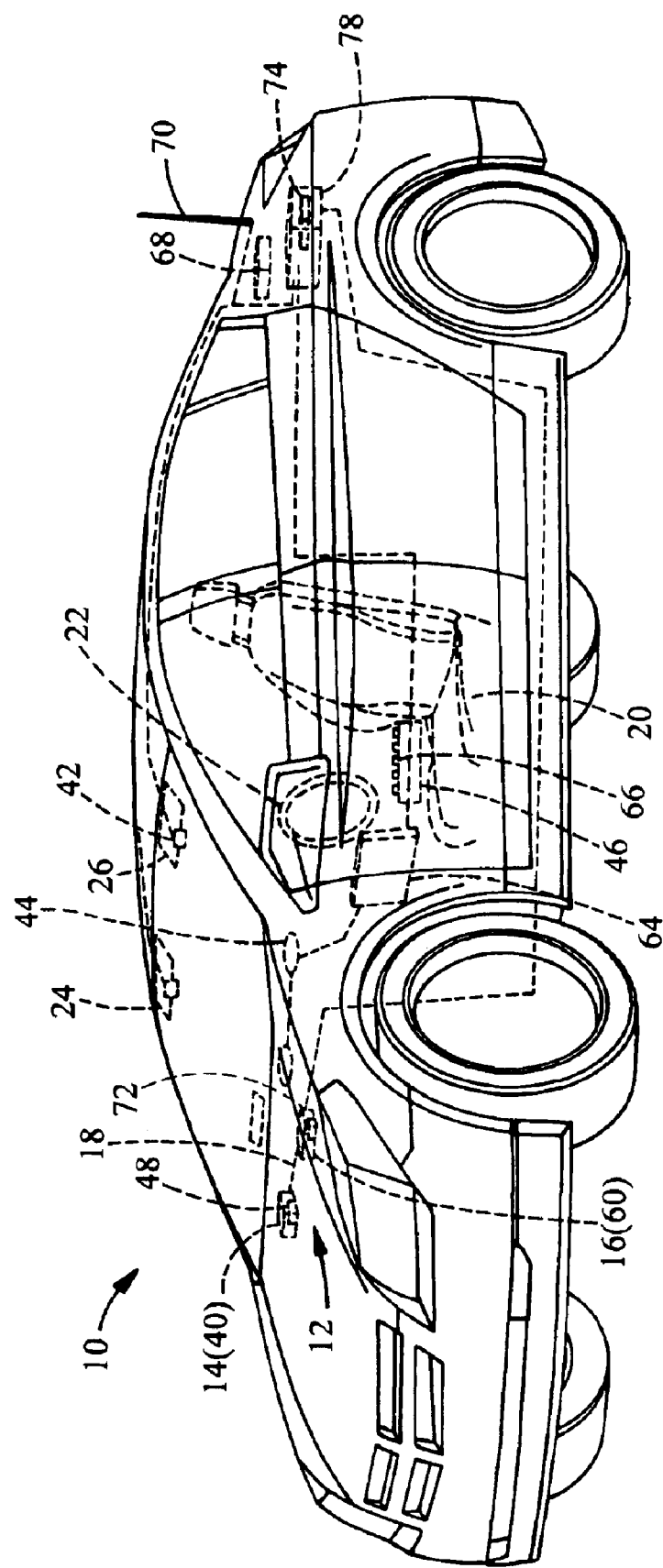
FIG. 1 is a perspective view of a motor vehicle incorporating a multiple vehicle system architecture capable of synchronizing data between two systems in accordance with a preferred method of the present invention.
Figure 2:
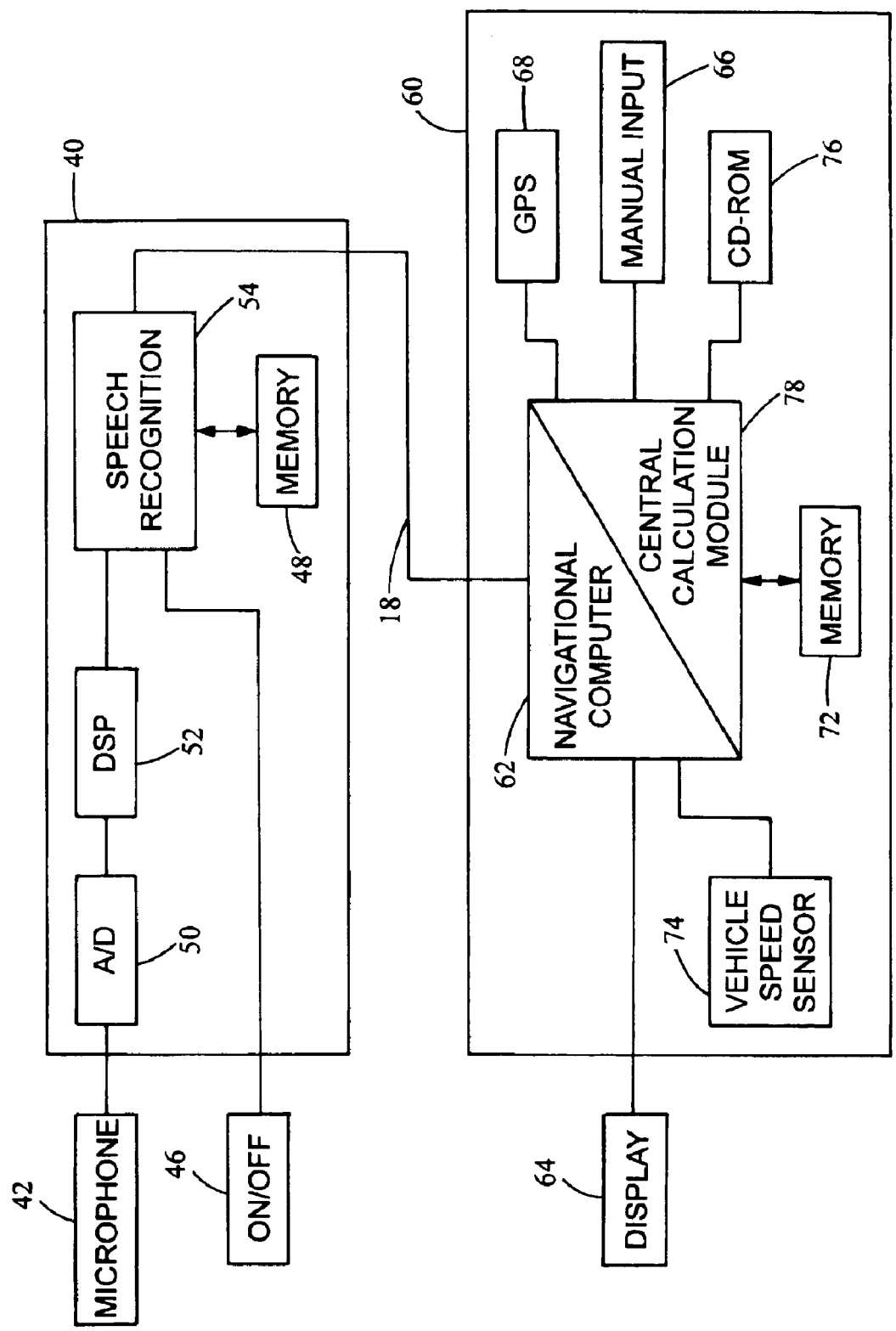
FIG. 2 is a schematic block diagram showing the relationship between two vehicle systems capable of synchronizing data in accordance with the preferred method of the present invention.

FIG. 1 illustrates a motor vehicle 10 that incorporates a multiple vehicle system architecture 12. The multiple vehicle system architecture 12, which may include numerous computer systems, includes a first computer system 14, a second computer system 16, and an interface 18 between the two systems 14, 16. The two computer systems in the multiple vehicle system architecture 12 shown in FIG. 1 are arbitrarily labeled a first computer system 14 and a second computer system 16. Furthermore, the depiction of two vehicle systems is not intended to limit the scope of the preferred data synchronization method of the present invention, but rather only to illustrate a simplified example of the invention. Indeed, motor vehicles utilizing multiple vehicle system architectures frequently have several distinct systems and the preferred method of the present invention can be utilized to synchronize data among numerous systems. The motor vehicle 10 depicted in FIG. 1 is shown to illustrate the environment and general context in which the method according to the present invention can be utilized.

In addition to the first vehicle system 14 and second vehicle system 16, the motor vehicle 10 shown in FIG. 1 also includes numerous functional elements typically associated with vehicles, such as a driver seat 20, a steering wheel 22, a rear view mirror 24, and a sun visor 26. As will be developed more fully below, these functional elements can be utilized by the systems 14,16 of the motor vehicle 10.

The preferred method of the present invention synchronizes data between a voice control system 40 (the first computer system 14) and a navigation system 60 (the second computer system 16).

The voice control system 40 includes a microphone 42 for collecting voice input from the driver or other occupants of the motor vehicle 10, a speaker 44 for relying instructions and other information to the driver, and an on/off switch 46 for enabling the input of data. The microphone 42 is arranged such that it collects voice input from the driver while sitting in the driver's seat 20. Thus, the microphone 42 is preferably may be disposed near the steering wheel 22, the rear view mirror 24, the sun visor 26. To operate the voice control system 40, a driver activates the on/off switch 46 to enable the system 40 for data input. Next, the driver speaks into the microphone 42 and data collection begins. Later, the user can activate the on/off switch 46 a second time to stop the data collection process. Alternatively, the voice control system 40 may be configured to begin the data collection process when a particular command is spoken and detected. No matter which activation method is utilized, to operate the voice control system 40, the driver speaks a nametag into the microphone 42. Then, the system 40 processes the nametag accordingly.

The voice control system 40 preferably includes computer memory 48 for storing data. The memory 48 can be either short-term random access memory (RAM), rewriteable memory, read only memory (ROM), any combination thereof, or any other suitable memory. To provide the user with maximum flexibility and convenience, the memory 48 is preferably non-volatile, rewriteable memory. The voice control system 40 may divide the memory 48 into various portions and designate each portion for a particular function. For example, one portion of the memory can be dedicated to storing nametags, and another portion can be dedicated to storing a nametag configuration indicator, which will be developed more fully below.

Typical voice control systems also include various electrical componentry for processing voice samples, such as an analog to digital converter 50, a digital signal processor 52, and a speech recognition module 54.

The navigation system 60 preferably includes a navigational computer 62 for detecting vehicle movement, determining vehicle speed, calculating distances, and performing other navigational functions. Also, the navigation system 60 preferably includes a graphical display 64 capable of presenting navigational data in a graphical manner. The navigation system 60 may further include a manual input device 66, a GPS receiver 68 for receiving positional information, and an antenna 70. Similar to the voice control system 40, the navigation system 60 preferably includes computer memory 72 for storing data. The memory 72 can be RAM memory, rewriteable memory, ROM, any combination thereof, or any other suitable memory. To provide the user with maximum flexibility and convenience, the memory 72 is preferably non-volatile, rewriteable memory. Also similar to the voice control system 40, the navigation system 60 may divide its memory 72 into various portions and designate each portion for a particular function. For example, one portion of the memory 72 can be dedicated to storing nametags, and another portion can be dedicated to storing the nametag configuration indicator of the navigation system 60. Lastly, the navigator system may include components that facilitate the performance of navigation functions, such as a vehicle speed sensor 74, as well as components for data access and/or storage, such as a CD-ROM drive 76. The navigation system 60 may also include a central calculation module 78 that receives information from the various components and determines which information should be transmitted to the graphical display 64 and the manner in which it should be displayed.

An example of the interaction between the two systems 40, 60 of the preferred embodiment will now be described. This example also shows the importance of synchronizing data between the two systems 40, 60. The voice control system 40 and the navigation system 60 interact with each other via an interface 18 between the two systems 40, 60. This interaction is such that the voice data collected by the microphone 42 controls the operation of the navigation system 60, ultimately determining the information illustrated on the graphical display 64. For example, if the driver activates the on/off switch 46 so that the voice control system 40 is ready for data input and subsequently speaks a word or phrase into the microphone 42 that is recognized by the system 40, the system 40 consults its memory 48 and determines if the input voice data matches a nametag stored in memory 48. If there is no match, the voice control system 40 may notify the driver via the speaker 44 of the lack of a match and/or prompt for additional input by the driver. However, if there is a match, the voice recognition 40 transmits the nametag via the interface 18 to the navigation system 60. Once the nametag is received, the navigation system 60 consults its memory 72, and determines if it has graphical data associated with the nametag. If there is no data associated with the nametag, the navigation system 60 may provide feedback to the voice control system 40 via the interface 18, allowing the voice control system 40 to notify the driver of the error or prompt for additional data input. On the other hand, if the navigation system 60 does have data associated with the nametag, the navigation system 60 displays the data on the graphical display 64. Subsequently, the navigation system 60 can update the graphical display 64 as appropriate depending on vehicle speed, direction, position, and other navigational parameters as determined by the navigational computer 62. Also, the navigation system 60 can update the display 64 based upon additional input by the user.

The use of nametags greatly simplifies the operation of the two systems within the multiple vehicle system architecture 12. For example, by associating a relatively small piece of data, such as a nametag, with a larger piece of data or collection of data, each system utilizes less memory. Also, nametags make the voice control system 40 and navigation system 60 easier for the driver to operate by requiring less speech and manual input of data.

As indicated above, nametags can act as a bridge between two systems in a multiple vehicle system architecture 12 representing data input such as with the voice control system 40, and data output, such as with the navigation system 60. Users of systems that allow the storage of customized data sets frequently have need to add, delete, or modify data entries. Certainly, with a voice control system 40 and a navigation system 60, a typical driver will have some entries that remain in the system for a relatively long period of time, such as nametags for "home", "work", or other common destinations. However, it is foreseeable that users will desire an ability to enter nametags on a short-term basis as well. For example, it may be desirable to associate nametags with navigational data representing seasonal or other intermittent destinations. Once the user's need for these nametags no longer exists, it is desirable to allow the user to edit and/or replace the nametag. Thus, a system that allows easy editing of entries will be more useful. Frequent editing of nametags, however, presents an opportunity for system failure. For example, one system may fail to store the edited or new nametag in its memory, or another system may fail to associate the edited or new nametag with the appropriate data.

Figure 3:
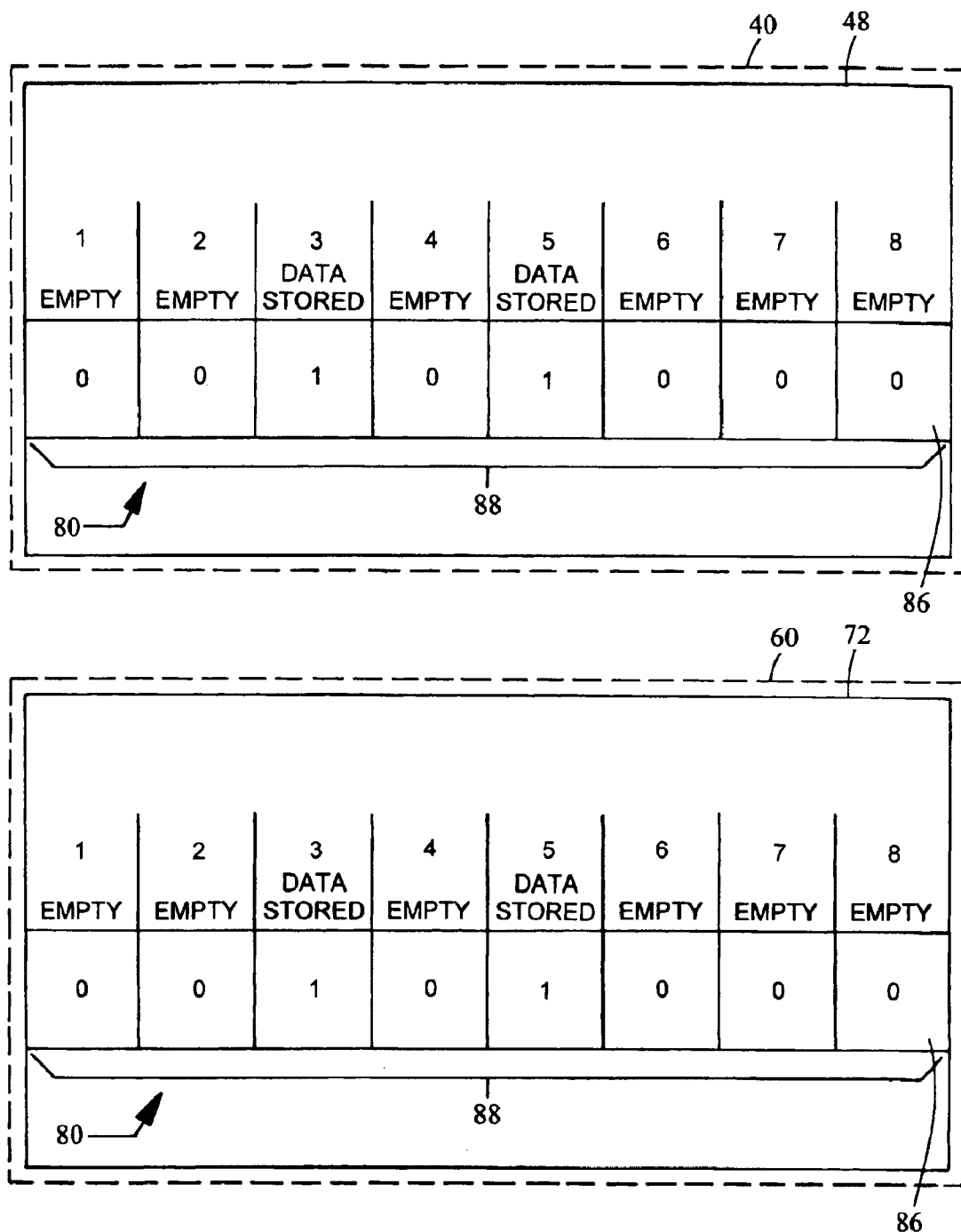
FIG. 3 is a diagram of memory area constructions for nametag configuration indicators in accordance with the present invention.

The data synchronization method of the present invention achieves the synchronization function by the use of nametag configuration indicators 80. FIG. 3 illustrates memory area constructions 82 corresponding to nametag configuration indicators 80 for the first computer system 14 and second computer system 16 of the motor vehicle 10. Each of these systems 14, 16 preferably has a fixed number of internal memory locations 84 for storing nametags or other data forms. Each system 14, 16 stores a nametag configuration indicator 80 in its memory by preferably assigning a bit 86 a value of 1 for each internal memory location 84 that currently has a nametag assigned. For example, if both systems 14, 16 have eight (8) internal memory locations 84 available for storing nametags, each system maintains one byte 88 of memory for its nametag configuration indicator 80. Each bit 86 of the dedicated byte 88 corresponds to a particular internal memory location 84. Preferably, the bits 86 proceed from left to right as the internal memory locations 84 increase numerically. In the example illustrated in FIG. 3, the third and fifth internal memory locations 84 currently have nametags stored, while the remaining internal memory locations 84 do not contain nametags. Thus, in both of the systems 14, 16, the first and second bits 86 of the byte 88 assigned for the nametag configuration indicator 80 are set to a value of 1, while the remaining bits 86 have values of 0.

It is important to note that, while the example shown in FIG. 3 includes only a single byte 88 of memory for the nametag configuration indicator 80, the systems 14, 16 can have multiple bytes dedicated to storing the nametag configuration indicator 80. Indeed, the only limit on the size of the nametag configuration indicator 80 is the amount of memory dedicated by the system 14, 16 for storing the nametag configuration indicator 80, which may be a factor of cost, size, or both.

As the size of the nametag configuration indicator 80 increases, the comparison function, which will be developed more fully below, increases in scope accordingly.

It is also important to note that the nametag configuration indicator 80 is not limited to merely storing the presence of absence of nametags in various memory locations 84 by assigning appropriate values to appropriate bits 86. The memory dedicated to storing the nametag configuration indicator 80 could also store information such as file size, a unique file identifier, or even a time stamp appropriate for a particular nametag. This additional degree of nametag identification affords more specificity to the synchronization method of the present invention.

As indicated above, the nametag configuration indicator 80 provides the basis of the synchronization method of the present invention. Thus, prior to conducting the synchronization method of the present invention, the user, if desired, assigns and stores nametags or other relevant data to the internal memory locations 84 of one of the systems 14, 16. This can be accomplished by using the systems 14, 16 according to their instructions. For example, in a typical voice control system 40, the user can store a nametag simply by preparing the system 40 for input, recording the nametag, and instructing the system 40 to store the nametag. Once the nametags or other appropriate data are stored in memory, each of the systems 14, 16 accesses its memory designated for the nametag configuration indicator 80 and sets the value of each bit 86 accordingly. That is, each of the systems 14, 16 sets the bits 86 corresponding to memory locations 84 having nametags stored therein to 1, and leaves those bits 86 corresponding to memory locations 84 that lack nametags set to 0. After setting the bits 86 as appropriate, the systems 14, 16 store the nametag configuration indicator 80 in the portion of memory dedicated to the nametag configuration indicator 80. At this point, the nametag configuration indicator 80 can be utilized in synchronization methods according to the present invention.

Figure 4:
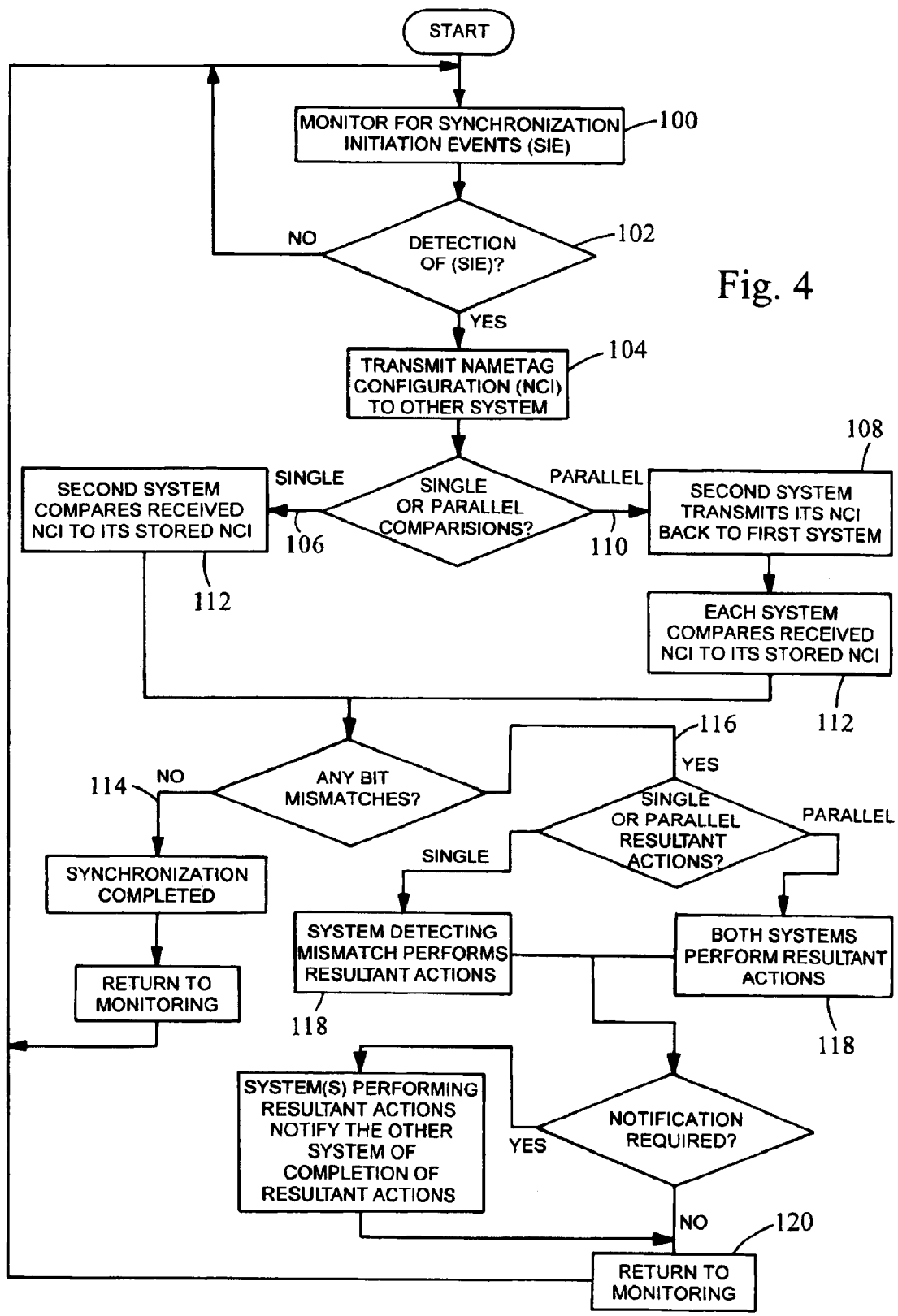
FIG. 4 is a flow diagram of the preferred data synchronization method in accordance with the present invention.

FIG. 4 illustrates the preferred synchronization method of the present invention in the form of a flow diagram. In a first step 100 of the synchronization method, the systems preferably monitor for synchronization initiation events. The synchronization initiation events are events that signal a need to ensure synchronization between data, and may include startup of the vehicle, startup of one or both systems, replacement of a system or a system component, recording of a nametag or other data point or set by a user, a failure event in one or more systems, initiation of a vehicle diagnostic routine, such as during vehicle maintenance, and initiation of data synchronization by the user of the systems. For the user to be able to initiate data synchronization, one of the computer systems must allow the user to initiate synchronization. When one of the systems detects 102 a synchronization initiation event, it transmits 104 its nametag configuration indicator to the other system via the interface. At this point, a single comparison 106 of the nametag configuration indicators can be performed within the second vehicle system, i.e., the system receiving the nametag configuration indicator. Alternatively, receipt of the nametag configuration indicator by the second vehicle system can trigger the second system to send 108 its nametag configuration indicator to the first system, which detected the synchronization initiation event, thereby enabling parallel comparisons 110 of nametag configuration indicators, i.e., comparisons between stored and received nametag configuration indicators within each of the two systems. Whether a single or dual comparison is performed will depend on whether the relationship between the two systems is a master-slave type of relationship or not. In a master-slave relationship, the master system can perform the comparison and instruct the slave system as to how to proceed based upon the results of the comparison.

For the comparison step 112, whether single or parallel, the system receiving the nametag configuration indicator compares the received nametag configuration indicator to its stored nametag configuration indicator on an individual bit basis, comparing values at each bit location. Thus, at each bit of the stored nametag configuration indicator, the system determines if the value of the bit stored in its memory matches the value of the bit transmitted in the nametag configuration indicator. Note that, if the nametag configuration indicators are large enough to include multiple bytes, the comparison can be conducted on individual bytes. In this manner, the values of corresponding bytes are compared to each other. If no mismatches occur 114, i.e., the bits at each corresponding position have the same value, the nametag configuration indicators are synchronized and no further action is necessary. However, if a mismatch is detected 116 during the comparison step 112, one or both systems initiate a resultant action 118.

Resultant actions 118 are responses to mismatches in nametag configuration indicators and ensure the synchronization of data after a mismatch. The resultant action 118 may be a deletion of all nametags from memory in both systems, the deletion of only the nametags that are mismatched, notifying the user as to the mismatched nametags and prompting for additional input regarding further action, or any other suitable action. Due to the simplicity in operation and limited effect on the systems involved, the resultant action of deleting only those nametags that are mismatched is preferred. Following performance of the resultant action 118, one or both systems may notify the other system that the action has been completed. This notification can be accomplished by sending a predetermined signal to the other system via the interface, such as an electronic signal containing a bit message having a value that the other system recognizes as a signal that the resultant action has been completed. Lastly, the systems preferably return to monitoring 120 for synchronization initiation events.

The preferred method of the present invention synchronizes data between a voice control system 40 and a navigation system 60 in a multiple vehicle system architecture 12. This preferred method proceeds largely as detailed above, with a voice control system 40 as the first vehicle system 14, and a navigation system 60 as the second vehicle system 16.

To begin the synchronization method, both the voice control system and navigation system monitor for synchronization events 100. Once such an event is detected 102, such as the recording of a new nametag by a user, the voice control system transmits 104 its nametag configuration indicator to the navigation system via the interface. Since parallel comparisons are preferred, on receipt of the nametag configuration indicator from the voice control system, the navigation system transmits 108 its nametag configuration indicator to the voice control system. Next, the comparison function is performed 112 by both systems in parallel 110. That is, each system compares its nametag configuration indicator to the nametag configuration indicator 80 received by the other system 40, 60. For the comparison 112, each system compares the values of each bit in the two nametag configuration indicators. If there are no mismatches 114, the synchronization method is completed, and the systems return to monitoring for synchronization initiation events 120. However, if a mismatch is detected 116 by either system, one or both of the systems initiates the performance of a resultant action 118. As indicated above, the resultant actions can include a deletion of all nametags from memory in both systems, the deletion of only the nametags that are mismatched, the prompting of the user as to the mismatched nametags and requesting additional input regarding further action, or any other suitable action. Lastly, after completion of the resultant action, the systems return to monitoring for synchronization initiation events 120.

It will be realized that the above description presents a preferred method of the invention, and that the invention may include additional steps or may involve performing steps in a different order.

The foregoing disclosure is the best mode devised by the inventors for practicing the invention. It is apparent, however, that several variations in methods for synchronizing data between systems in a multiple vehicle system architecture in accordance with the present invention may be conceivable by one skilled in the art. Inasmuch as the foregoing disclosure is intended to enable one skilled in the pertinent art to practice the instant invention, it should not be construed to be limited thereby, but should be construed to include such aforementioned obvious variations and be limited only by the spirit and scope of the following claims.

We claim:

1. A method for synchronizing data comprising:

providing the first and second computer systems in a vehicle;

connecting the first and second computer systems via an interface;

maintaining a configuration indicator having bit values in a memory of the first computer system;

maintaining a configuration indicator having bit values in a memory of the second computer system;

transmitting the bit values corresponding to the configuration indicator from the first computer system to the second computer system via the interface;

comparing the bit values of the configuration indicator of the first computer system to the bit values of the configuration indicator of the second computer system; and triggering a resultant action upon detection of a mismatch of said bit values of said configuration indicators.

2. The method according to claim 1, further comprising monitoring for synchronization initiation events.

3. The method according to claim 2, wherein the synchronization initiation events include startup of the vehicle, a startup of one of the first and the second computer systems, replacement of one of the first and the second computer systems, a failure event in one of the first and the second computer systems, an initiation of a diagnostic routine in the vehicle, and an initiation of data synchronization by a user of the first or the second computer system.

4. The method according to claim 1, wherein the first computer system comprises a voice control system and the second system comprises a navigation system.

5. The method according to claim 1, wherein the configuration indicator of each computer system stores data related to the presence or absence of a nametag.

6. The method according to claim 1, wherein the configuration indicator of each computer system stores data related to one of a size, a time, a date stamp, and a unique identifier of a file.

7. The method according to claim 1, further comprising the second computer system transmitting the bit values corresponding to the configuration indicator from the second computer system to the first computer system.

8. The method according to claim 1, wherein said comparing the bit values of the configuration indicator of the first computer system to the bit values of the configuration indicator of the second computer system occurs in the second computer system.

9. The method according to claim 1, wherein said comparing the bit values of said configuration indicator of the first computer system to the bit values of the configuration indicator of the second computer system occurs in both the first and the second computer systems.

10. The method according to claim 1, wherein said triggering a resultant action includes one of deleting all data corresponding to said configuration indictors of the first and the second computer systems, deleting data corresponding to bits mismatched between said configuration indicator of the first computer system and said configuration indicator of the second computer system, and notifying a user of the first and second computer systems of a mismatch between said configuration indicators of the first and second computer systems and prompting said user for further action.

11. The method according to claim 1, further comprising notifying the first computer system by the second computer system of the completion of the resultant action.

12. A method for synchronizing data between a first and second computer system in a vehicle having a multiple vehicle system architecture, the first and second computer systems being connected via an interface and each maintaining a configuration indicator having bit values in memory, comprising the steps of:

monitoring for synchronization initiation events;

upon detection of a synchronization initiation event, the first computer system transmitting the bit values corresponding to the configuration indicator to the second computer system via the interface;

comparing the bit values of the configuration indicator of the first computer system to the bit values of the configuration indicator of the second computer system; and triggering the performance of a resultant action upon detection of a mismatch of the bit values of the configuration indicators.

13. The method according to claim 12, wherein the first computer system comprises a voice control system and the second computer system comprises a navigation system.

14. The method according to claim 12, wherein the configuration indicator of each of the computer systems stores data related to the presence or absence of a nametag.

15. The method according to claim 12, wherein the configuration indicator of each computer system stores data related to one of a size, a time, a date stamp, or a unique identifier of a file.

16. The method according to claim 12, wherein the synchronization initiation events include startup of said vehicle, startup of one of the first and the second computer systems, replacement of one of said first and the second computer systems, a failure event in one of the first and the second computer systems, initiation of a diagnostic routine in said vehicle, and initiation of data synchronization by a user of the first and the second computer systems.

17. The method for the synchronization of data between a first and second computer system in a multiple vehicle system architecture according to claim 12, further comprising transmitting the bit values corresponding to the configuration indicator from the second computer system to the first computer system.

18. The method according to claim 12, wherein said comparing the bit values of the configuration indicator of the first computer system to the bit values of the configuration indicator of the second computer system occurs in the second computer system.

19. The method according to claim 12, wherein said comparing the bit values of the configuration indicator of the first computer system to the bit values of the configuration indicator of the second computer system occurs in both the first and the second computer systems.

20. The method according to claim 12 wherein the resultant action is a member selected from the group consisting of deleting all data corresponding to said configuration indicators of the first and the second computer systems, deleting data corresponding to bits mismatched between said configuration indicator of the first computer system and said configuration indicator of the second computer system of a mismatch between said configuration indicators of the first and second computer systems and prompting said user for further action.

21. The method for the synchronization of data between a first and second computer system in a multiple vehicle system architecture according to claim 12 further comprising notifying the first computer system by the second computer system of the completion of the resultant action.

* * * * *